US010013781B1

(12) United States Patent
Gammage et al.

(10) Patent No.: US 10,013,781 B1
(45) Date of Patent: Jul. 3, 2018

(54) SEWING MACHINE-STYLE POLYGON DRAWING METHOD

(71) Applicant: Google LLC, Mountain View, CA (US)

(72) Inventors: Christopher Gammage, Sunnyvale, CA (US); Aleksey Boyko, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/621,837

(22) Filed: Jun. 13, 2017

(51) Int. Cl.
G06T 11/00 (2006.01)
G06T 11/20 (2006.01)
G06F 3/048 (2013.01)
G06F 3/0481 (2013.01)
G06F 3/0485 (2013.01)
G06F 3/01 (2006.01)
(Continued)

(52) U.S. Cl.
CPC ........ *G06T 11/203* (2013.01); *G06F 3/04845* (2013.01); *G06N 5/047* (2013.01); *G06N 99/005* (2013.01); *G06T 3/40* (2013.01); *G06T 3/20* (2013.01); *G06T 2210/41* (2013.01)

(58) Field of Classification Search
CPC ........ G06T 11/00; G06T 11/20; G06T 11/203; G06T 11/80; G06T 7/0012; G06F 3/0481; G06F 3/30485; G06F 3/048; G06F 3/0485; G06F 3/04812; G06F 3/01; G06F 3/011; G06F 3/033; G06F 3/0338; G09G 2340/045; G09G 2340/0464; G01N 2015/0065; G01N 33/48; G01N 33/483; G01N 33/4833
See application file for complete search history.

(56) References Cited

U.S. PATENT DOCUMENTS 5,721,959 A 2/1998 Nakamura et al.
7,377,995 B2 5/2008 Chen et al.
(Continued)

FOREIGN PATENT DOCUMENTS

EP 1 679 652 A1 7/2006

OTHER PUBLICATIONS

You-tube video, https://www.youtube.com/watch?v=5SowFAAZj8M&t=63s, The new Anchor Point tool | Adobe Illustrator | lynda.com, Apr. 12, 2015, 2 pages.
(Continued)

Primary Examiner — Ke Xiao
Assistant Examiner — Andrew Shin
(74) Attorney, Agent, or Firm — McDonnell Boehnen Hulbert & Berghoff LLP

(57) ABSTRACT

A method for drawing a polygon using a graphical user interface includes a display of an object includes an indicator which remains fixed on the display of the object, e.g., at the center of the display. This indicator is referred to herein as the "focus." The image of the object moves under the focus (by the user executing a drag operation on the image with the mouse or the finger if a touch screen is used) and the focus stays fixed. While the image is moved by the user under the focus, a trail of vertices is created which are interconnected by lines. When the user indicates they are finished with the moving step the last vertex created in the sequence is connected with the first vertex at the start of the moving with a connecting line, completing the forming of a boundary around the region of interest.

18 Claims, 2 Drawing Sheets

(51) Int. Cl.
*G06F 3/0484* (2013.01)
*G06T 3/40* (2006.01)
*G06N 99/00* (2010.01)
*G06N 5/04* (2006.01)
*G06T 3/20* (2006.01)

(56) References Cited

U.S. PATENT DOCUMENTS

| | | | | |
|---|---|---|---|---|
| 2002/0057256 | A1* | 5/2002 | Flack | G06F 1/1626 345/157 |
| 2011/0060766 | A1* | 3/2011 | Ehlke | G06F 3/0481 707/802 |
| 2011/0194749 | A1* | 8/2011 | Morris | G01N 1/286 382/133 |
| 2011/0316878 | A1* | 12/2011 | Chodos | G09G 5/397 345/629 |
| 2014/0049628 | A1* | 2/2014 | Motomura | G02B 21/367 348/77 |
| 2017/0372471 | A1* | 12/2017 | Eurèn | G06K 9/6256 |

OTHER PUBLICATIONS

You-tube video, https://www.youtube.com/watch?v=yTvMeWbsMGY, Draw a Freeform Shape in Word 2007, TechTutor.TV, Apr. 15, 2009, 2 pages.

PCT International Search Report and Written Opinion, PCT International Application No. PCT/US2017/062630, dated Feb. 27, 2018, 15 pages.

Ramer, Urs, "An Iterative Procedure for the Polygonal Approximation of Plane Curves", Computer Graphics & Image Processing, vol. 1, No. 4, Apr. 1, 1972, pp. 244-256.

Liang, J. et al., "United Snakes", Medical Image Analysis, vol. 10, No. 2, 2006, pp. 215-233.

Liang, J. et al., "Interactive Medical Image Segmentation With United Snakes", Medical Image Computing and Computer-Assisted Intervention, International Conference, Jan. 1, 1999, pp. 116-127.

* cited by examiner

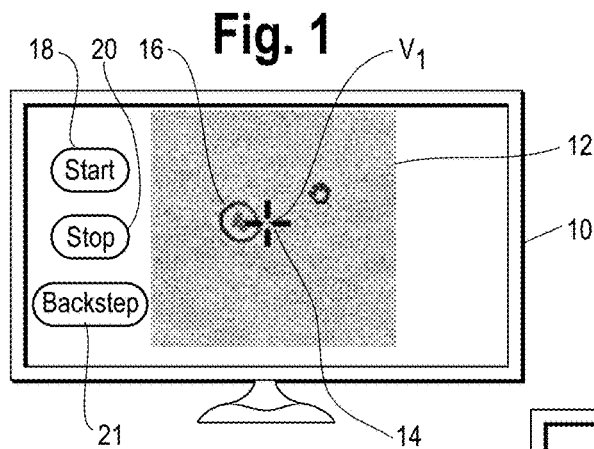
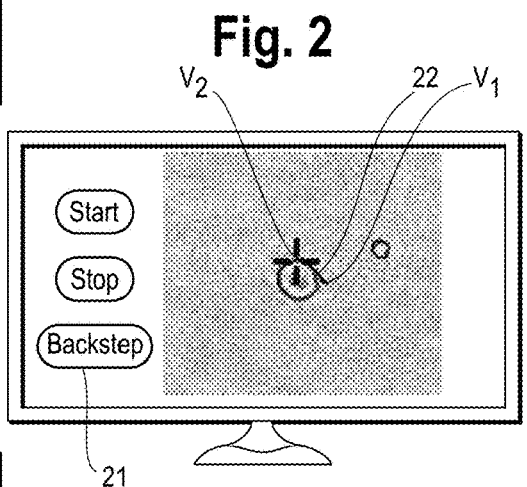
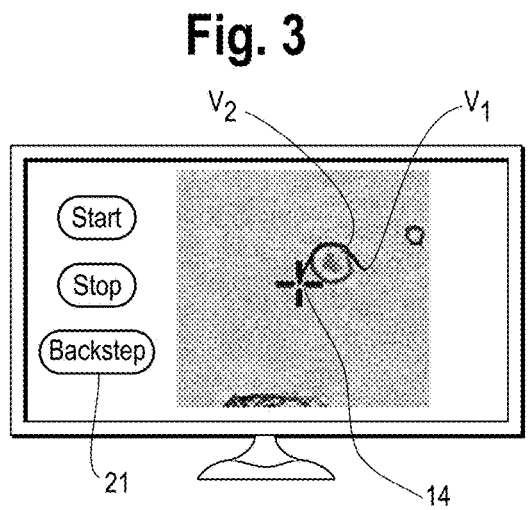
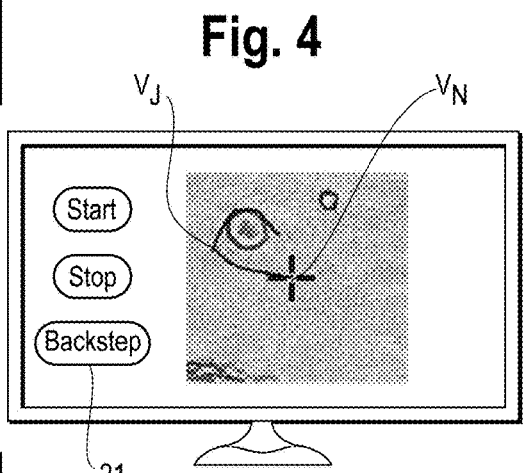
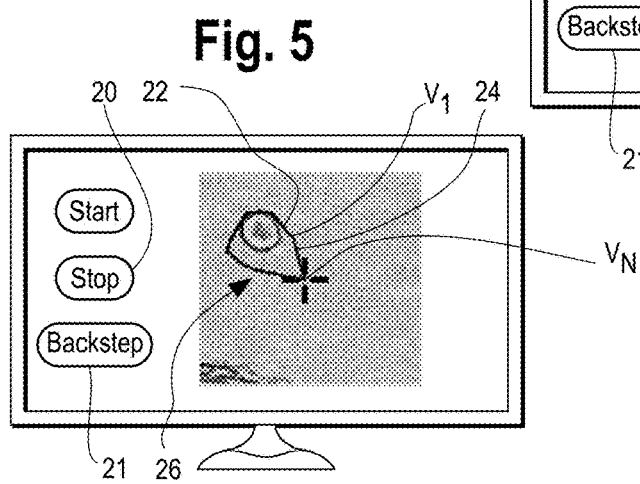

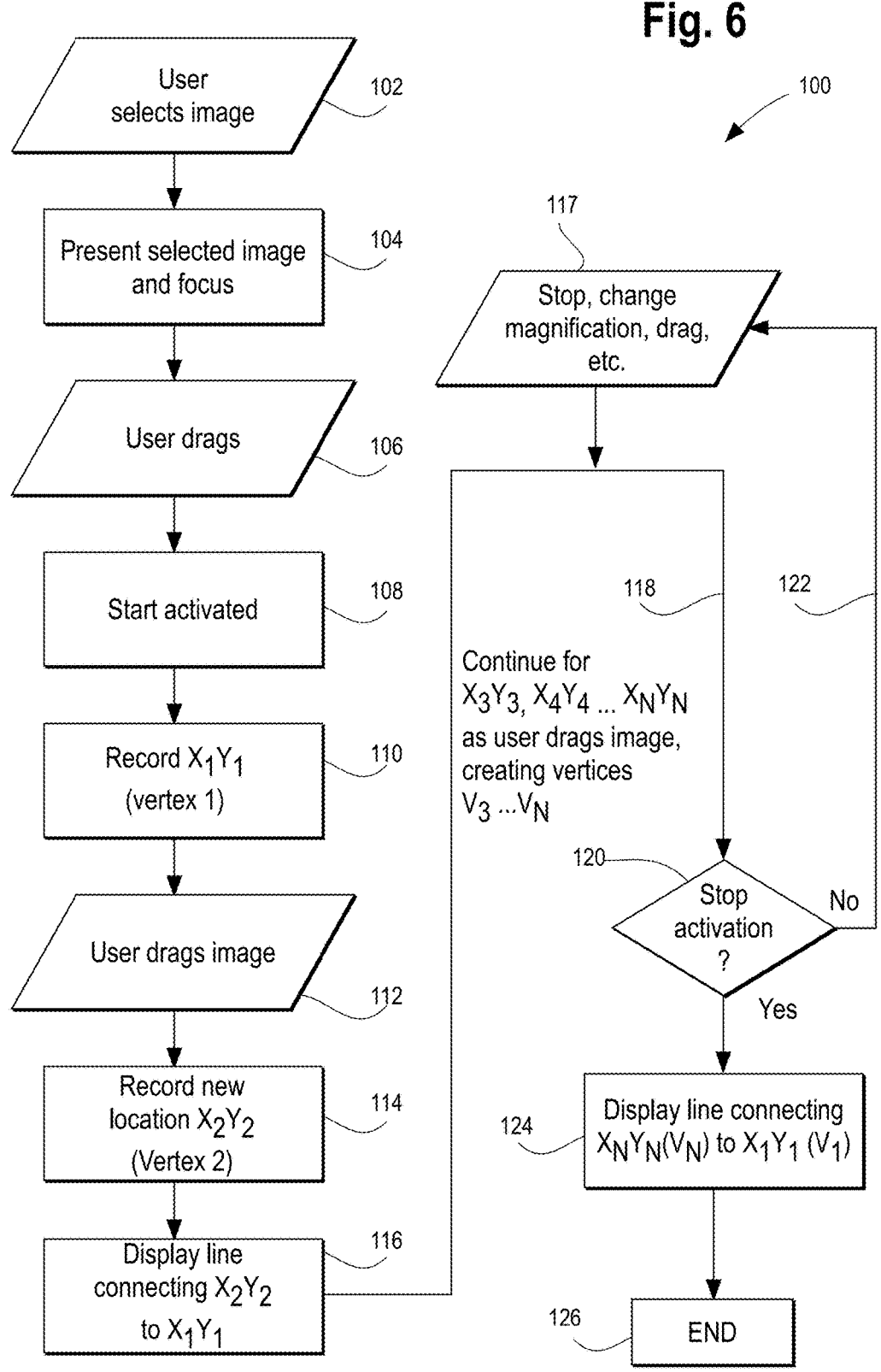

SEWING MACHINE-STYLE POLYGON DRAWING METHOD

FIELD

This disclosure relates to techniques for drawing a polygon border using a graphical user interface. The invention has particular applications in pathology, for example drawing a border around a cluster of cells or region of interest in a magnified digital image of a biological sample.

BACKGROUND

In digital pathology, pathologists often have a need to draw very detailed polygonal regions or borders around areas of interest in magnified digital images in order to annotate the image. One single annotation can take over 30 minutes to draw.

Typically, the task of drawing the polygon consists of using a mouse continuously to trace a path around the area of interest. In particular, existing polygonal annotation tools have a fixed image on the screen while the mouse cursor is the point of drawing. The user moves the mouse around the image and it leaves a trail of vertexes from which the polygon is formed. The problems with this approach are several:

a. The users hands can get tired from doing this for prolonged periods without letting go of the mouse button.

b. The users may need to zoom in and out of the image while drawing the annotation so as to get a higher level of detail. This requires stopping the drawing function. Other technology sometimes allows the user to zoom in and out while drawing, but it causes the mouse cursor to move and draws a jagged edge on the polygon.

c. Users may make a mistake and wish to erase part of what they have drawn without having to start over on this very large complex polygon. Some viewers allow the user to make modifications to the polygon by manipulating the vertices afterwards, but this is very cumbersome.

d. The context around where the user is drawing while drawing is very important to the tasks. If an image is fixed on the screen, some parts of the image the user is drawing will be closer to the edge while they are drawing and therefore giving less context at that region the user is concentrating on.

SUMMARY

The invention relates to a method for drawing a polygon using a graphical user interface. The user interface includes a display of an object, for example, a magnified digital image of tissue or other biological sample, and the polygon is a boundary around some region of interest in the object, e.g., some region of interest to a pathologist, such as a cluster of cancer cells present in the image.

The display of the object includes an indicator which remains fixed on the display of the object, preferably at the center of the display of the object, which is used to construct the vertices of the polygon. This indicator is referred to herein as the "focus." Instead of moving with the mouse cursor while the user is drawing, as in the prior art, in this disclosure the image moves under the focus (by the user executing a drag operation on the image with the mouse or the finger if a touch screen is used) and the focus stays fixed. While the image is moved by the user under the focus, it leaves a trail of vertices, which form a polygon. This behavior is analogous to using a sewing machine where the sewing machine needle and point of sewing remains fixed in space but the material is moved arbitrarily by the user under the needle.

In particular, to perform the method of drawing the polygon, the user moves the object relative to the focus, e.g., by clicking and dragging the object, to a point where they wish to begin drawing the polygon and a first vertex is created at the focus. As the object is moved by the user relative to the focus, a trail of vertices and connecting lines forming the boundary is displayed over the object indicating the path of movement, including a first vertex and a final vertex. At any point the user can stop the movement step and zoom in or out, but the focus remains present and fixed on the display, e.g., at the center, along with the trail of vertices and connecting lines indicating the previous path of movement. The connecting lines form the boundary around the object and indicate the path of movement of the object relative to the fixed indicator. The boundary is displayed over the object, i.e., superimposed on the object. The user activates a user interface function (e.g., button on the display) indicating they are done with the polygon, whereby the polygon is completed by connecting with a line the final vertex created at the last movement of the object with the first vertex created when the process was started.

The above description of the method is from the perspective of user actions. The invention can also be characterized an improvement to a workstation having a user interface and a display of an object in the form of a set of software instructions which permit the method to be performed. These modules include:

a) instructions presenting on the display an object, such as for example a magnified image of tissue and an indicator (i.e., the "focus") which remains fixed on the display, preferably at the center of the object display, which is used to construct a set of vertices of the polygon;

b) controls for allowing a user to move the object relative to the indicator, e.g., by clicking and dragging the object with a mouse, or by dragging the object with the finger if the user interface is a touch screen;

c) instructions displaying a set of vertices and connecting lines indicating the path of the user moving the object relative to the indicator, including a first vertex indicating the position of the object relative to the indicator at the start of the moving and a last vertex indicating the position of the object relative to the indicator at the end of the moving; and d) instructions for connecting the last vertex to the first vertex with a connecting line and displaying the connecting line to thereby complete the boundary of the polygon.

In another aspect, a workstation is disclosed (e.g., a workstation used by a pathologist to annotate a magnified digital image of tissue) having the set of software instructions as described above.

The invention is useful particularly in the context of digital pathology. In one variation, the method is used to annotate pathology images. In another aspect, the method can be used to create boundaries of objects, e.g., cancerous or benign areas, on a multitude of digital slide images to facilitate training of machine learning pattern recognizers for assisting in cancer detection. Thus, in one further aspect, a method is provided for creating a set of training slides for training a machine learning pattern recognizer, comprising the steps of:

(a) obtaining a multitude of magnified digital images;

(b) annotating the multitude of magnified digital images by drawing a polygon around one or more regions of interest in each of the members of the set of magnified digital images in accordance with the method recited above, and (c) saving the annotated set of magnified digital images as annotated in step b) for use in training the machine learning pattern recognizer.

BRIEF DESCRIPTION OF THE DRAWINGS

FIGS. 1-5 are a series of screen shots showing the process of drawing a polygon around an object in an image in accordance with one embodiment of the invention.

In FIG. 1, the user has moved the object to a position where the fixed focus is over the portion of the object where the user wants to create the first vertex ($V_1$) of the polygon.

In FIG. 2, the user has moved the object to a position where a second vertex ($V_2$) is created at the focus.

In FIG. 3, the user has moved the object to a position where a further vertex is created at the focus. This vertex is shown as $V_j$ in FIG. 4.

In FIG. 4, the user has moved the object to a position where a further vertex is created at the focus, in this particular Figure where the last vertex ($V_n$) is created.

In FIG. 5, a line is constructed and displayed connecting the last vertex $V_n$ with the first vertex $V_1$ to complete the polygon.

FIG. 6 is a flow chart showing the method and operation of software modules present on the workstation of FIGS. 1-5.

DETAILED DESCRIPTION

Referring now to the Figures, the method will be described in detail. FIG. 1 shows a graphical user interface 10 of a workstation, for example a conventional workstation of a pathologist. The workstation includes a processing unit and memory storing software instructions which is conventional. The user interface includes a display 12 of an object, in this example a magnified digital image of a biological sample such as a tissue sample. The object (i.e., digital image), is composed of pixel data with X/Y coordinates indicating the position in two dimensions of each pixel. The method allows for the drawing of a polygon in the form of a multitude of vertices and connecting lines which form a boundary around a region of interest 16 in the object, for example a cluster of cells. The display 12 includes a display of a fixed indicator 14, referred to herein as the "focus", which could take several forms such as cross hairs as shown in FIGS. 1-5, which is superimposed on the object and which is used to construct the vertices of the polygon.

The method will be described in conjunction with FIGS. 1-5 and in the flow chart indicating a set of software instructions and user actions in FIG. 6. Initially, as shown in step 102 of FIG. 6, the user selects an image for display, such as by activating a drop-down list of images to annotate on the workstation 10 and selecting one of the images. At step 104 the selected image (object) is presented on the display area 12 of the user interface 10 as well as the focus 14, as shown in FIG. 1. At step 106, the user drags (e.g., with the mouse of the user interface, or using their finger in the case of a touch sensitive display) or otherwise moves the object on the display so as to have the fixed indicator or focus 14 positioned relative to the region of interest 16 to a first location where they wish to commence drawing the polygon. At step 108 the user then activates a start icon 18 on the user interface. At step 110, the X/Y location or position of object at the focus 14 is recorded and a first vertex V1 is created at that location, $X_1/Y_1$.

At step 112, the user drags the image to a new position, see FIG. 2, and the workstation software records the new location $X_2/Y_2$ at step 114, and a new vertex $V_2$ is created at that location. At step 116 a line (22 in FIG. 2) is displayed connecting vertex $V_2$ (position $X_2/Y_2$) to $V_1$ ($X_1/Y_1$). If the user wishes to undo this action and create a new vertex $V_2$, they can activate the backstep icon 21 and the line 22 is removed and the object is moved such that the vertex $V_1$ is positioned at the focus 14.

The process continues with the user dragging the object relative to the focus 14, storing a set of locations $X_3/Y_3, \ldots X_N/Y_N$ indicating the path of movement (vertices $V_3 \ldots V_n$), connecting the vertices with lines, and displaying the vertices and lines superimposed on the object. For example, in FIG. 3, the user has dragged the object to a position partially around the object of interest, creating vertex $V_j$ (see FIG. 4) and in FIG. 4 they have dragged the object such that vertex $V_n$ is at the location of the focus 14.

During this time, as indicated by the loop 122, the user may cease the dragging operation, e.g., to rest their hand, take a break, use the workstation or mouse for other tasks, etc., change magnification, undo a portion of the boundary and create a new boundary, and so on, as indicated at 117. Note that if the user stops and uses the mouse for other actions not related to drawing the polygon the current state of the polygon is not lost or disturbed. Moreover, if they change magnification the X/Y location of the vertices is preserved and the user simply views the object at the new magnification.

By positioning the focus at the center of the display 12 of the object, the user can change magnification and the maximum amount of peripheral context for the object is preserved. The user will not have the issues of drawings borders at the very edge of the display (and missing context) as in prior art approaches.

In FIG. 5, the user indicates they have finished with the polygon drawing by activating the stop icon 20. This is indicated in FIG. 6 at step 120. The software modules in the workstation include a module 124 which displays a line connecting the last vertex $V_n$ at position $X_n/Y_n$ to the first vertex $V_1$, as indicated by the line 24. The process then ends as indicated at step 126 of FIG. 6. The user then can provide further text annotations or take other action, such as for example export the image file with the polygon to a report they are creating in accordance with workflow software or procedures which are used by the pathologist.

As another example, the image of the object with the polygon, along with any further annotations or comments (such as, for example, whether the polygon circumscribes cancerous cells, or benign cells) can be stored in memory with other annotated objects and such annotated objects used as a training set for training a machine learning pattern recognizer.

Thus, in one aspect we have described an improvement to a workstation 10 (FIG. 1) having a computer readable storage medium (memory) storing a set of software instructions for to assist a user in drawing a polygon on the display 12, the set of software instructions comprising:

a) instructions 104 (FIG. 6) for presenting on the display 12 an object (FIG. 1 and an indicator (i.e., the "focus") 14 (FIG. 1) which remains fixed on the display 12 which is used to construct a set of vertices of the polygon as the user moves the object relative to the indicator, see FIGS. 2-6;

b) controls for allowing a user to drag the object on the display relative to the indicator, for example by dragging the object using a mouse or by touching and dragging the object if the display is in the form of a touch screen;

c) instructions 116 for displaying a set of vertices and connecting lines (see FIGS. 1-5) indicating the path of the user dragging the object relative to the indicator, including a first vertex $V_1$ (FIG. 1) indicating the position of the object relative to the indicator at the start of the dragging and a last vertex $V_n$ (FIG. 5) indicating the position of the object relative to the indicator at the end of the dragging; and d) instructions 124 for connecting and displaying the last vertex to the first vertex to thereby complete the boundary of the polygon, see FIG. 5, line 24.

Further Considerations

In one configuration, the workstation of FIG. 1 includes a processing unit and a memory, e.g., hard disk (conventional, not shown). The memory stores the set of software instructions as described above to enable the performance of the procedure described above in conjunction with FIGS. 1-6. The workstation could take the form of a conventional personal computer with local memory and processing unit and attached peripherals including the user interface 10, keyboard and a mouse (not shown).

The nature of the object displayed in the display 12 is not particularly important, and in theory could be an image of anything. The invention is particularly suitable for magnified digital images of a biological sample, such as for example a sample obtained from a human. For example, the object could a tissue sample, such as lymph node, breast or prostate tissue, which may contain cancerous cells. Another example is blood, sputum, stool or other type of sample, and the user may wish to draw polygons around pathogens present in the sample, such as malaria protozoa, tuberculosis mycobacteria, eggs of parasites, etc.

As noted above in FIG. 6, the user can stop the moving/dragging of the object relative to the focus change magnification of the object on the display. However, the object remains centered on focus at the new magnification and the user can proceed to drag the image under the new magnification and create a new trail of vertices. Thus, in this embodiment, the method allows the user to create portions of the polygon at multiple different levels of magnification.

The backstep icon 21 (FIG. 1) is useful if the user wishes to undo part or all of the polygon they have created. In one configuration, when the icon 21 is activated a selected number of previous vertices are removed and the image is panned/moved so that the focus is at the last vertex in the sequence. The interface could include controls or a toolbar to allow the user to customize and configure how many previous vertices from the current vertex are deleted, for example just 1 or perhaps 2 or more.

In FIGS. 1-5, it will be noted that the focus is positioned at the center of the display 12, so as to maximize the field of view of areas surrounding the focus in all directions. In some situations it may be desirable to fix the position of the focus at some other location on the display, for example where a significant portion of the display is devoted to other tasks, such as entering text, providing tools for making further annotations, and so on.

While a primary application of the present disclosure is facilitating pathologist annotation of a magnified digital images, there are other possible uses of the method, including training neural network patter recognizers. In one example, pattern recognizers (such as deep convolutional neural networks) are emerging as a new tool to aid in pathologist review of biological specimens. The Google Inception-v3 deep convolutional neural network architecture, is one example and is described in the scientific literature. See the following references, the content of which is incorporated by reference herein: C. Szegedy et al., Going Deeper with Convolutions, arXiv:1409.4842 [cs.CV] (September 2014); C. Szegedy et al., Rethinking the Inception Architecture for Computer Vision, arXiv:1512.00567 [cs.CV] (December 2015); see also U.S. patent application of C. Szegedy et al., "Processing Images Using Deep Neural Networks", Ser. No. 14/839,452 filed Aug. 28, 2015. A fourth generation, known as Inception-v4 is considered an alternative architecture for the pattern recognizers. See C. Szegedy et al., Inception-v4, Inception-ResNet and the Impact of Residual Connections on Learning, arXiv: 1602.0761 [cs.CV] (February 2016). See also U.S. patent application of C. Vanhoucke, "Image Classification Neural Networks", Ser. No. 15/395,530 filed Dec. 30, 2016. The description of the convolutional neural networks in these papers and patent applications is incorporated by reference herein.

Additional literature describing deep neural network pattern recognizers include the following G. Litjens, et al., Deep learning as a tool for increasing accuracy and efficiency of histopathological diagnosis, www.nature.com/scientificreports 6:26286 (May 2016); D. Wang et al., Deep Learning for Identifying Metastatic Breast Cancer, arXiv: 1606.05718v1 (June 2016); A. Madabhushi et al., Image analysis and machine learning in digital pathology: Challenges and opportunities, Medical Image Analysis 33 p 170-175 (2016); A. Schuamberg, et al., H&E-stained Whole Slide Deep Learning Predicts SPOP Mutation State in Prostate Cancer, bioRxiv preprint http:/.bioRxiv.or/content/early/2016/07/17/064279.

Such patter recognizers are typically trained from a large set of images of cancerous and benign tissue. It may be useful to help train pattern recognizers to identify cancerous or benign tissue by creating manually polygons around regions of interest in training slides, using the features of this disclosure, and then saving such annotated digital images in a data store and using such images for network training, or validation. Hence, in one possible embodiment, a pathologist, or group of pathologists, may inspect say 250 or 500 training slides of magnified digital prostate tissue images, annotate them by drawing polygons around areas of cancerous and benign cells using the features of this disclosure, and then using the 250 or 500 annotated training slide images to train a neural network pattern recognizer. In one possible example, the objects are magnified whole slide scanned images of tissue samples.

The inventive aspects of the present method overcome many of the drawbacks of the prior art. In particular, the method of this disclosure allows the user to let go of the mouse button while drawing and do other things, or rest their hand, without disrupting the drawing process or causing unintended deviations or mistakes in the polygon border. Further, modification of the annotation is readily possible if they have made a mistake by using the backstep feature of FIGS. 1-5. Further, the method permits the user to zoom in and out whilst drawing so that they can annotate at higher detail in more complex parts of the image.

This technique allows the user to do multiple repetitions of "click, drag" to pan the image under the focus point and thereby enables the user to pause at any time and rest their hand or click other user interface buttons. When the user is done, they can click a finish or stop button/icon (20, FIG. 1) to complete the annotation.

Since the focus is always at the center of the display 12 in the preferred embodiment, zooming in and out of the image while in "drawing mode" does not affect the location of the focus. This enables users to easily zoom in and draw at a higher level of detail in complex regions of the image, or zoom out and draw at a lower level of detail, while preserving display of surrounding context in all directions.

Since the image is moving under the focus, the amount of pixels visible to the user surrounding the focus is maximal at all times, whereas with a technique of drawing that follows the mouse cursor may have various level of detail omitted when the mouse cursor reaches the edge of the display, or regions near the edge or a corner, as in the prior art.

Further variations and modifications from the disclosed embodiments are of course possible and within the scope of the invention. All questions concerning scope are to be answered by reference to the appended claims.

We claim:

1. A method for drawing a polygon using a graphical user interface having a display of an object, the polygon in the form of a multitude of vertices and connecting lines forming a boundary around a region of interest in the object, wherein the display includes a fixed indicator superimposed on the object which is used to construct the vertices of the polygon, the method comprising the steps of
    (a) initially moving the object on the display so as to have the fixed indicator positioned relative to the object at a first location;
    (b) moving the object relative to the fixed indicator thereby creating a trail of vertices including a first vertex at the first location and a final vertex created at the completion of the moving step (b) and lines connecting the trail of vertices so as to form a portion of the boundary, wherein the portion of the boundary is displayed over the object, the boundary indicating the path of movement of the object relative to the fixed indicator;
    (c) activating a backstep function in which one or more previous vertices and connecting lines in the portion of the boundary are removed and the image is panned so that the fixed indicator is at the position last vertex in the trail of vertices; and
    (d) activating a user interface function indicating completion of the moving step (b), whereby the polygon is completed by connecting with a line the final vertex to the first vertex.

2. The method of claim 1, wherein the object comprises a magnified digital image of a biological sample.

3. The method of claim 2, wherein the biological sample is selected from group of samples consisting of a tissue sample and a blood sample.

4. The method of claim 2, wherein the magnified digital image contains cancerous cells.

5. The method of claim 1, further comprising the steps of: stopping the moving step b), and
    changing magnification of the object on the display, wherein the fixed indicator remains centered on the display after the change of magnification.

6. The method of claim 1, further comprising the steps of changing magnification levels of viewing of the object on the display and creating portions of the boundary at multiple different levels of magnification.

7. The method of claim 1, wherein the fixed indicator is located at the center of the display of the object.

8. The method of claim 1, wherein the object comprises a magnified digital image of a tissue sample and wherein the boundary is drawn around a region of interest in the magnified digital image containing one or more cancerous cells.

9. A method of creating a set of training slides for training a machine learning pattern recognizer, comprising the steps of:
    (a) obtaining a multitude of magnified digital images;
    (b) annotating the multitude of magnified digital images by drawing a polygon around one or more regions of interest in each of the multitude of magnified digital images in accordance with the method of claim 1;
    (c) saving the annotated set of magnified digital images as annotated in step b) for use in training the machine learning pattern recognizer.

10. The method of claim 9, wherein the magnified digital images are images of samples obtained from a human.

11. The method of claim 10, wherein the samples are selected from the group of samples consisting of tissue samples and blood samples.

12. A workstation comprising:
    a user interface and a non-transitory computer-readable medium storing a set of software instructions for the workstation,
    wherein the set of software instructions for the workstation assists a user in drawing a polygon on a display of an object presented on the user interface, the set of software instructions comprising:
    a) instructions presenting on the display the object and an indicator which remains fixed on the display which is used to construct a set of vertices of the polygon as the user moves the object relative to the indicator;
    b) controls allowing a user to drag the object on the display relative to the indicator;
    c) instructions displaying a trail of vertices and connecting lines indicating the path of the user dragging the object relative to the indicator, including a first vertex indicating the position of the object relative to the indicator at the start of the dragging and a last vertex indicating the position of the object relative to the indicator at the end of the dragging;
    d) instructions permitting the user to implement a backstep function in which one or more previous vertices and connecting lines in the polygon are removed and the image is panned so that the fixed indicator is at the position of the last vertex in the trail of vertices which was not removed by the backstep function; and
    e) instructions connecting the last vertex to the first vertex with a line to thereby complete the boundary of the polygon and displaying the line.

13. The workstation of claim 12, wherein the object comprises a magnified digital image of a biological sample.

14. The workstation of claim 13, wherein the biological sample is selected from group of samples consisting of a tissue sample and a blood sample.

15. The workstation of claim 14, wherein the magnified digital image contains cancerous cells.

16. The workstation of claim 12, wherein the set of instructions further comprises a module permitting stopping the moving and changing magnification of the object on the display, wherein the fixed indicator remains centered on the display after the change of magnification.

17. The workstation of claim 12, wherein the fixed indicator is located at the center of the display of the object.

18. The workstation of claim 12, wherein the workstation comprises a pathology workstation displaying magnified digital images of samples obtained from a human, and wherein the object comprises a magnified digital image of sample obtained from a human and wherein the boundary is drawn around a region of interest in the magnified digital image containing one or more cancerous cells.

* * * * *